United States Patent Office 3,160,821
Patented Dec. 8, 1964

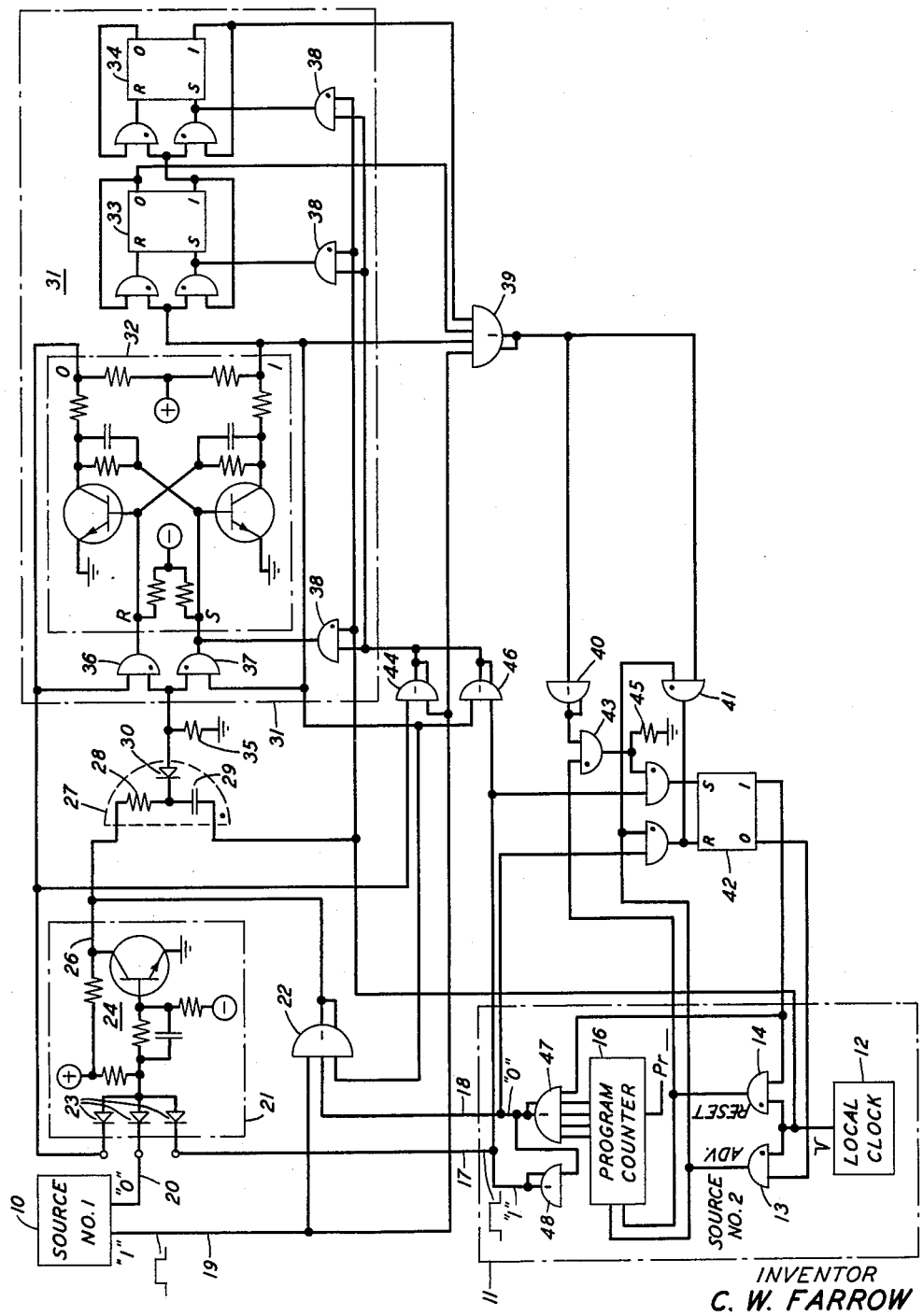

3,160,821
SYNCHRONIZING SYSTEM FOR PULSE SOURCES
Cecil W. Farrow, Monmouth Hills, N.J., assignor to Bell
Telephone Laboratories, Incorporated, New York, N.Y.,
a corporation of New York
Filed Sept. 25, 1961, Ser. No. 141,247
9 Claims. (Cl. 328—155)

This invention relates to a circuit for synchronizing pulses from different and essentially unrelated pulse sources.

In some digital operating circuits it is desirable to bring the operations of two unrelated sources into step with one another so that certain pulses from each source will coincide in point of time. One example of such a system would be a digital data receiver wherein a program counter is driven by a local clock at the data bit rate and must be kept in step with incoming data start pulses. However, on occasion noise may present false pulses and cause false synchronization of the two sets of pulses unless a synchronizing system is provided which is relatively immune to noise influences.

It is therefore a principal object of the present invention to synchronize two pulse sources reliably even though a high noise level may prevail.

Another object is to improve pulse source synchronizing techniques.

Still another object is to synchronize two pulse trains by new means which permit a liberalization of the minimum signal-to-noise ratios for equipments which are dependent upon pulse signals from those trains.

These and other objects of the invention are realized in an illustrative embodiment in which the drive input of a binary counter receives pulses from two different pulse sources which are to be synchronized. The pulses from those sources are received through two separate circuits that are operative only when pulses from the two sources do not occur in coincidence. Additional circuits are provided for resetting the counter if pulses from the two sources should appear to coincide. When a predetermined count level has been attained the counter output initiates a phase adjustment operation for the pulses from one of the two pulse sources.

It is one feature of the invention that corresponding pulses from two pulse sources may be brought into step with one another by means which are relatively immune to noise influences.

Another feature is that a combination of a binary counter and a unique arrangement of logic gates detects a phase mismatch of the pulses from the two sources which are to be synchronized and adjusts the phase of one of those sources.

Yet another feature of the invention is that a binary counter is arranged with first logic gates so that it may be driven from two pulse sources only when pulses from the sources occur alternately thereby indicating a phase mismatch. When the counter reaches a certain count level under these conditions it produces a signal which causes the operating phase of one of the sources to be adjusted.

A further feature is that an iterative pattern of alternately occurring pulses from two pulse sources is taken as an indication that the sources are out of phase with one another and a phase adjustment is directed. However, the short term appearance of alternate pulses or the appearance of successive pulses from one source is taken as an indication of noise in the system and no phase adjustment is directed.

Full comprehension of the various features, advantages, and objects of the invention should result from a consideration of the following detailed description and the appended claims when taken together with the attached drawing wherein the single figure is a schematic diagram of an illustrative embodiment of the invention.

In the drawing, two pulse sources 10 and 11 are shown and certain pulses from these sources are to be brought into step with one another. Source 10 may comprise, for example, circuits supplying data start pulses preceding each data word in a receiver for a data transmission system. In the same vein, source 11 may represent a source of receiver program control signals, one of which signals is a program pulse that should coincide with each received data start pulse. Source 11 is shown as including a local clock 12 which may be any type of local oscillator or signal-providing circuit which is adapted to the system as, for instance, an oscillatory circuit producing regenerated clock pulses recovered from received signals. The output of clock 12 is a relatively brief pulse, as shown in the drawing, and it is applied through logical AND gates 13 and 14, to be described, to the advance and reset inputs respectively of a program counter 16.

Counter 16 may be any suitable type of counter such as a conventional binary counter which is provided with logic circuits in a well known manner for deriving from the counter output signals which occur at predetermined program times. Such signals would be provided in the system by leads designated "Pr —." Counter 16 is also provided with ONE and ZERO output leads at which its program start pulse would appear. These leads are designated with the reference characters 17 and 18 and are connected to counter 16 through transistor-diode gates 48 and 47, respectively. Circuit details of this type of gate will be described subsequently in connection with a gate 21. Gate 47 is provided with input connections from various stages of counter 16 to enable the gate in a well known manner when the counter has attained a level at which counter reset is to be initiated in the normal cycle of operations. Gate 48 has a single input connection from the output of gate 47. The two gates together cause complementary voltages to be applied to leads 17 and 18. Each voltage pulse produced when gate 47 is enabled is the complementary program start pulse and is substantially longer than each pulse from clock 12 as can be seen from the pulse waveform adjacent lead 17. Upon the occurrence of the program start pulse, lead 17 is at a convenient positive potential while lead 18 is at ground. At other program times the potentials on these leads are reversed so that lead 17 is at ground and lead 18 is characterized by a positive potential.

Source 10 also has ONE and ZERO output leads, designated leads 19 and 20, which are also characterized by positive and ground signals, respectively, upon the occurrence of the data start pulse and by ground and positive potentials, respectively, at other times. Each data start pulse is similar to a program start pulse and each usually occupies a full data-bit time slot.

Two transistor-diode inverting AND gates 21 and 22 are provided for activation whenever the pulses from sources 10 and 11 get out of step with one another. Gates 21 and 22 are of the same type, and a schematic diagram of a typical one of such gates is shown for gate 21 whereas the drawing representation of this type of gate is typically that shown for gate 22. Each gate has one or more AND-connected diodes 23 at the input therefor coupling certain input signals to a common-emitter-connected transistor amplifier 24. Amplifier 24 is arranged in a well known manner as shown so that, when all of the input diodes 23 are disabled by positive input signals, amplifier 24 conducts and pulls its output lead 26 at the collector electrode of the amplifier to ground potential. However, if any one of the input diodes 23 is conducting, amplifier 24 remains in the nonconducting condition and a positive potential appears at its output lead 26.

Source output leads 17 and 20 are connected to inputs of gate 21 for enabling that gate when the two sources are out of step with lead 17 positive, and source output leads 18 and 19 are connected to enable gate 22 when lead 18 is positive. Output leads from gates 21 and 22 are connected together and to the enabling input of a diode AND gate 27. Gate 27 includes a resistor 28 and a capacitor 29 connected in series between the two gate input terminals. A diode 30 is connected between the common terminal of resistor 28 and capactor 29 and the output terminal of the gate. A ground signal applied to the resistor input allows a negative-going pulse to pass through the capacitor and the diode, but a positive signal applied to the resistor input prevents any pulse from going through the diode. The schematic simplification of this AND gate is a semicircle with a dot adjacent to the one input lead which is connected to capacitor 29.

Gate 27 is enabled by the ground signal from one of the input gates 21 or 22 and the next local clock pulse is gated through. The negative-going output pulses from gate 27 are utilized to drive a binary counter 31. This counter is a three-stage binary counter including three transistor flip-flop circuits of a well known type such as that illustrated for flip-flop 32. Negative-going pulse signals to the flip-flop may be applied to one of the input leads S or R to cause positive and ground output signals to appear at the ONE and ZERO output connections. If a negative-going pulse is applied to input lead R, the flip-flop is reset and produces a positive signal at the ZERO output and a ground at the ONE output. If the input pulse is applied to lead S a positive signal appears at the ONE output and a ground at the ZERO output.

A single input connection couples the output of AND gate 27 to the pulse input connections of two gates 36 and 37 which are in the reset and set inputs respectively of flip-flop 32 for operating that flip-flop in a complementing mode as a binary counter. A resistor 35 provides a leakage path to prevent the accumulation of excessive charges on the capacitors of gates 36 and 37. Gates 36 and 37 may be enabled by means of connections coupling back the ZERO output of the flip-flop to the enabling input of its reset gate 36 and coupling back the ONE output of the flip-flop to the enabling input of its set gate 37. Flip-flop circuit 32 also has connections from its ZERO and ONE outputs to input leads of gates 21 and 22, respectively, to disable each gate for one count of counter 31 after that gate has passed a counter drive pulse which advanced counter 31. This arrangement ensures that when flip-flop 32 is set, and a positive pulse appears on lead 19 from source 10 with no corresponding pulse from source 11, counter 31 will advance one count. However, if under similar counter conditions a pulse appears from source 11 with no pulse from source 10, counter 31 will not advance because gate 21 is inhibited by the ground ZERO output of flip-flop 32. In like manner, when flip-flop 32 is reset, counter 31 can be advanced only by a pulse from source 11. Counter 31 can continue to count only as long as pulses from sources 10 and 11 continue to alternate. If the pattern of alternation is broken, counter 31 is reset by gate 44 or gate 46 in a manner which will subsequently be described.

Each of the counter flip-flop circuits 33 and 34 is similar to flip-flop 32 but lacks the connections to gates 21 and 22. The ONE outputs of the flip-flops 32 and 33 are further connected to the complementing input connections of flip-flops 33 and 34, respectively. Gates 38 are also connected to the set inputs of the three counter stages for resetting counter 31 to the all-ONE conditon in a manner which will be described.

As alternate pulses from sources 10 and 11 are coupled through gates 21 and 22 for driving counter 31, its count condition advances in successive stages until it reaches the binary five count condition. At this time connections from the ONE outputs of flip-flops 32 and 34 and from the ZERO output of flip-flop 33 are all positive. The positive signals are applied as enabling input signals to a transistor-diode gate 39. The next positive pulse potential appearing on lead 19 of source 10 opens gate 39 to produce a ground output signal for application to a transistor-diode gate 40 and a diode gate 41 for the single time slot that the positive pulse remains on lead 19. The latter two gates are included in the set and reset input connections of a flip-flop circuit 42 which is normally in its set condition when local clock pulses are advancing program counter 16.

The next advance pulse from clock 12, after gate 39 has been enabled, passes through gate 13 in source 11 and is applied to the opening input of AND gate 41 to cause flip-flop 42 to be reset. Now the ground ONE output from flip-flop 42 enables AND gate 14 in source 11, and the next clock pulse passes through gate 14 to reset program counter 16 to some predetermined program count such as the count of two, Pr 02. The same resetting clock pulse, the second clock pulse after gate 39 had been opened, also opens a gate 43. The gate 43 had been enabled by a ground from gate 40 which is opened when gate 39 is disabled by the ending of the pulse from source 10. A resistor 45 prevents gate lock-up as explained for resistor 35. Gate 43 opens the set gate of flip-flop 42 which is enabled by the ground on lead 17 at reset program time Pr 02. Flip-flop 42 is set and its ground ZERO output enables gate 13 so that normal advance operations may resume for counter 16.

Each time that a normal program start pulse occurs at the end of a program when sources 10 and 11 are in step, the program counter 16 is reset with the assistance of flip-flop 42. The start pulse from source 11 puts lead 18 at ground and enables the reset gate of flip-flop 42. A first following advance pulse from gate 13 resets the flip-flop to enable gate 14, and at the same time advances counter 16 beyond the start pulse stage. The second following clock pulse resets counter 16 to program time Pr 02 and opens the set gate of flip-flop 42 because that gate is now enabled by the ground which is now on lead 17. The setting of flip-flop 42 reopens advance-pulse gate 13, and program counter 16 starts a new counting cycle. When pulses from sources 10 and 11 get out of step, counter 31 causes counter 16 to be reset as has been described; but special attention must be given the two cases wherein the pulse from source 10 comes in the time slot immediately after, and the time slot immediately before, the pulse from source 11.

If pulses from sources 10 and 11 should get out of step, with each pulse from source 10 occurring in the time slot immediately following each pulse from source 11, counter 31 begins to operate; and gate 39 is thereafter enabled. The ground output from gate 39 disables gate 40 to block gate 43 and thereby prevent the setting of flip-flop 42 as long as gate 39 is enabled. This prevents flip-flop 42 from being confused by receiving a reset signal from gate 39 through gate 41 at the same time that the ground on lead 17 is calling for a set operation in the time slot following the program start pulse. Thus, the direction from gate 39 controls; and flip-flop 42 is reset to initiate a resetting operation of program counter 16 as previously described.

If pulses from sources 10 and 11 should get out of step with each pulse from soure 10 occurring in the time slot immediately preceding each start pulse from source 11, gate 39 is again enabled after counter 31 has reached the appropriate synchronizing level. Now the output of gate 39 enables gate 41 so that the next clock pulse, the same one that advances counter 16 to its start count level, resets flip-flop 42. The second clock pulse after the opening of gate 39 now resets counter 16; but if a start pulse were permitted on leads 17 and 18 at this time, the same resetting clock pulse could not set flip-flop 42 as it should normally do because the set gate of that flip-flop would be inhibited by the positive voltage on counter start lead 17. The resetting of counter 16 does not completely free that set gate of the inhibition until after the resetting clock pulse has expired. If this were permitted to happen, flip-flop 42 would not be set until a second reset pulse from gate 14 appeared after the initial resetting of counter 16, and such operation would leave program counter 16 in control. To avoid this, the ONE output of flip-flop 42 is connected to an input of gate 47. Now, when flip-flop 42 is in its reset condition, its ground ONE output inhibits transistor-diode gate 47 to prevent the appearance of a start signal on leads 17 and 18. Consequently, the reset pulse which resets counter 16 also sets flip-flop 42 so that the synchronizing signal from gate 39 controls the program counter resetting operation.

The next time that counter 16 generates a program start pulse after being reset, a pair of transistor-diode gates 44 and 46 compare that pulse with the condition of flip-flop 32 in counter 31 to determine whether or not counter 31 should be permitted to continue counting. Gate 46 is partially enabled by the positive signal on the output lead 17 from source 11. A further input signal for gate 46 comes from the ONE output of flip-flop 32 in counter 31. If the previous pulse counted by counter 31 had come from source 11, flip-flop 32 would be in its set condition and the positive output on lead 17 opens gate 46 thereby applying a ground signal to enable the reset gates 38 of counter 31. The latter gates then pass the next negative-going pulse from local clock 12, and counter 31 is restored to its all-ONES condition. Gate 21 is now disabled by the ground ZERO output of flip-flop 32, and forces the next counter 31 drive pulse to come from source 10.

In a similar fashion, if two successive pulses should appear at the output of source 10 with no intervening pulse from source 11, gate 44 is then enabled because at that time flip-flop 32 is in its reset condition as a result of the first of the two pulses from source 10. Gate 44 enables the reset gates for counter 31, and the counter is reset as before. It may be noted here that when output pulses from source 11 and source 10 are in coincidence it appears to gates 44 and 46 that pulses from the respective sources are occurring in sequence with no intervening pulses from the other source. Accordingly, these gates apply a reset signal to counter 31 in response to each coincidence of pulses from sources 10 and 11. However, as soon as pulses from the two sources slip out of step, gates 44 and 46 are no longer enabled and the first pulse from source 10 which occurs out of step with a pulse from source 11 opens gate 22 to start the advance of counter 31 and repeat the counting operation as previously described to bring about the resetting of counter 16.

If pulses from sources 10 and 11 appear in coincidence after counter 31 has been advanced a few counts, it is a strong indication that the first few counts were produced as a result of noise which distorted output pulses from one of the sources. Accordingly, the coincidence condition causes one of the gates 44 or 46 to be enabled to reset counter 31 thereby preventing a false resetting of program counter 16 in response to the noise pulses.

Although the present invention has been described in connection with a particular embodiment thereof, it is to be understood that additional embodiments and modifications which may be obvious to those skilled in the art are included within the spirit and scope of the invention.

What is claimed is:

1. A synchronizing circuit for two pulse sources providing similar pulse trains on two-wire lines, one wire of each line being characteristically positive for a first pulse type and the other wire of each line being characteristically positive for a second pulse type, two AND circuits, means applying to one of said AND circuits one wire from each of said lines, said one wire being positive for different ones of said pulse types, means applying to the other of said AND gates the remaining wires of said lines, a binary counter with a drive input connection to the outputs of said AND circuits, logic means connected to said counter for generating a signal in response to the occurrence of a predetermined count level, and means responsive to said logic circuit signal adjusting the phase of one of said sources.

2. The signal synchronizing circuit in accordance with claim 1 in which connections are provided from output terminals of said binary counter to each of said AND circuits for inhibiting the AND circuit which passed the previous advance pulse to said counter drive input connection.

3. The signal synchronizing circuit in accordance with claim 1 which comprises in addition logic means detecting the occurrence of a pulse from a first one of said sources following another pulse from said first source with no intervening pulse from the second one of said sources, the last-mentioned logic means comprising two additional AND circuits, means enabling the input to each of said circuits from corresponding leads in the output of different ones of said sources, connections from said counter to enable each of said additional AND circuits when the source providing enabling signals to that circuit also produced the last counter advance pulse, and means connected to the outputs of said additional AND circuits resetting said binary counter to a predetermined initial condition if either of said last two AND circuits becomes fully enabled.

4. A signal synchronizing circuit for cooperating with a first pulse source including a counting circuit which produces signals on different output leads at different count levels, one of such signals being adapted to be in time coincidence with a recurring pulse of a second source, said synchronizing circuit comprising a binary counter having a drive input connection, a first gate applying a drive signal to said connection in response to a recurring pulse from said second source, a second gate applying a signal to said counter drive connection in response to said one signal of said pulse counting circuit, and means resetting said counting circuit in response to the attainment of a predetermined count level in said binary counter.

5. The synchronizing circuit in accordance with claim 4 in which said first source includes means providing clock signal pulses, and separate circuits applying said clock pulses to advance and reset inputs, respectively, of said counting circuit, and said counting circuit resetting means comprises a switch circuit, gate means in each of said separate circuits, and means connecting said switch circuit between said binary counter and said gate means for routing said clock pulses through different ones of said gate means to reset said first source counting circuit at said predetermined count and to advance said first source counting circuit at other binary counter levels.

6. The synchronizing circuit in accordance with claim 4 in which a pulse mismatch detector is provided for indicating a lack of time coincidence in the occurrence patterns of pulses from said first and second sources, said detector comprising a third gate connected to be opened by signals from said binary counter and said first source indicating that said first source is attempting to supply two successive advance pulses to said counter with no intervening pulse from said second source, a fourth gate connected to be opened by signals from said counter and from said second source indicating that said second source has supplied two successive advance pulses with no intervening pulse from said first source, and means connecting the outputs of said third and fourth gates to restore said binary counter to a predetermined rest condition.

7. The synchronizing circuit in accordance with claim 6 in which feedback connections are provided from said binary counter to input connections of said first and second gates for inhibiting each of said gates for a time interval of one count after such gate has supplied an advance pulse to said binary counter.

8. A synchronizing circuit for two pulse sources, said circuit comprising AND logic connected to said sources for producing a pulse in response to each mismatch in the occurrence times of pulses from said sources, a counter connected to be operated by pulses from said logic, and means responsive to an output condition of said counter adjusting the operating time of one of said sources to reduce said mismatch.

9. The synchronizing circuit in accordance with claim 8 which further comprises additional AND logic means receiving outputs from said counter and from said sources, and means connected to said additional logic for resetting said counter in response to the appearance of successive pulses from one of said sources with no intervening pulse from the other source.

References Cited in the file of this patent

UNITED STATES PATENTS

| | | |
|---|---|---|
| 2,490,500 | Young | Dec. 6, 1949 |
| 2,858,426 | Meserve et al. | Oct. 28, 1958 |
| 2,891,157 | Hansel | June 16, 1959 |
| 2,892,945 | Ule | June 30, 1959 |
| 2,951,152 | Sichak et al | Aug. 30, 1960 |
| 3,008,087 | Darwin | Nov. 7, 1961 |